(12) United States Patent
Kersten

(10) Patent No.: US 7,001,123 B2
(45) Date of Patent: *Feb. 21, 2006

(54) THREADED BOLT HAVING MEASUREMENT PLANES FOR USE IN ULTRASONIC LENGTH MEASUREMENTS

(75) Inventor: Ferdinand Kersten, Gemert (NL)

(73) Assignee: Koninklijke Nedschroef Holding N.V., Helmond (NL)

(*) Notice: Subject to any disclaimer, the term of this patent is extended or adjusted under 35 U.S.C. 154(b) by 0 days.

This patent is subject to a terminal disclaimer.

(21) Appl. No.: 10/812,218

(22) Filed: Mar. 29, 2004

(65) Prior Publication Data

US 2004/0179918 A1    Sep. 16, 2004

Related U.S. Application Data

(63) Continuation of application No. 09/955,522, filed on Aug. 18, 2001, now Pat. No. 6,712,570, which is a continuation of application No. PCT/NL00/00087, filed on Feb. 11, 2000.

(30) Foreign Application Priority Data

Mar. 18, 1999 (NL) ..................................... 1011591

(51) Int. Cl.
*F16B 31/02* (2006.01)
(52) U.S. Cl. .................. 411/8; 411/14; 73/761
(58) Field of Classification Search ...... 44/8, 44/13, 14, 393; 73/761
See application file for complete search history.

(56) References Cited

U.S. PATENT DOCUMENTS

| 2,778,265 A | 1/1957 | Brown |
| 4,304,424 A | 12/1981 | Hansen |
| 4,506,917 A | 3/1985 | Hansen |
| 4,569,229 A | 2/1986 | de Halleux |
| 4,846,001 A | 7/1989 | Kibblewhite ................. 73/761 |
| 5,029,480 A | 7/1991 | Kibblewhite |
| 5,131,276 A | 7/1992 | Kibblewhite |
| 5,352,065 A | 10/1994 | Arnall et al. |
| 6,009,759 A | 1/2000 | Kibblewhite |
| 6,186,010 B1 | 2/2001 | Eguchi |

FOREIGN PATENT DOCUMENTS

| EP | 0 459365 A1 | 5/1991 |
| EP | 0 759 333 A1 | 8/1996 |
| WO | WO 97/44644 | 5/1997 |

OTHER PUBLICATIONS

DAF Standard Prod 9257; Apr. 1998; Issue 06; pp. 1-7
Eidesstattliche Erklarung; Affidavit; Joachim Lang; Feb. 27, 2004.
Reisebericht; Apr. 27, 1998; Travel Report; Osterode, Apr. 27, 1998 Lueger Lixikon Der Technik; pp. 1-3 and 475-480.

*Primary Examiner*—Flemming Saether
(74) *Attorney, Agent, or Firm*—Young & Thompson

(57) ABSTRACT

The invention relates to a threaded bolt provided with measurement planes for use in ultrasonic length measurement. After the threaded bolt has been fixed in a connection, such measurement is performed to determine the length change of the threaded bolt, in order to find out the tension within the threaded bolt in that way.

28 Claims, 3 Drawing Sheets

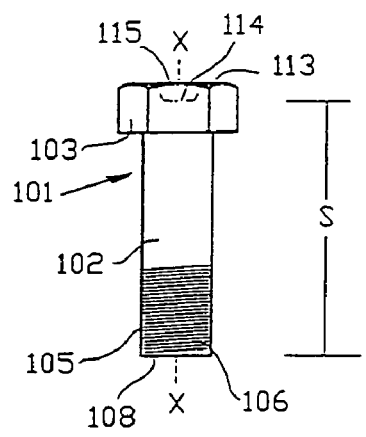
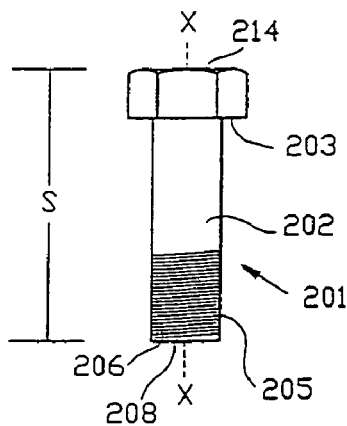
FIG. 2A   FIG. 2B
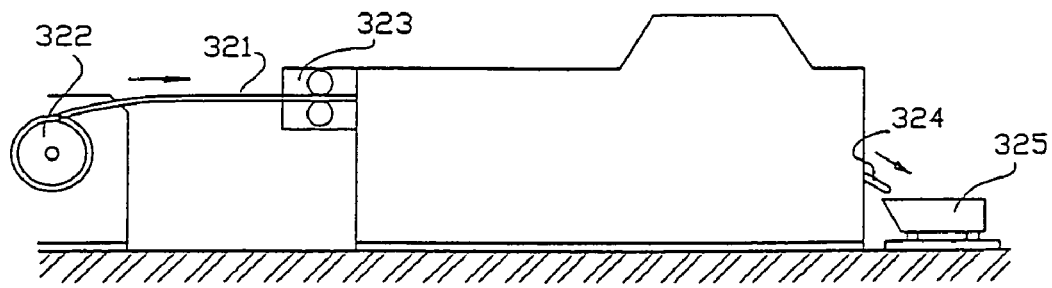
FIG. 3A
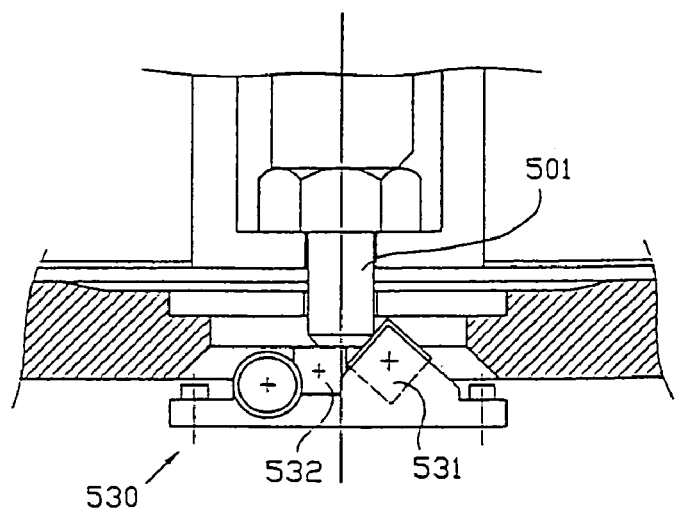
FIG. 4

THREADED BOLT HAVING MEASUREMENT PLANES FOR USE IN ULTRASONIC LENGTH MEASUREMENTS

CROSS-REFERENCE TO RELATED APPLICATIONS

This application is a continuation of U.S. patent application Ser. No. 09/955,522, filed on Aug. 18, 2001, now U.S. Pat. No. 6,712,570, which was a continuation of PCT/NL00/00087, filed on Feb. 11, 2000, which claimed priority to Netherlands application no. 1011591, filed Mar. 18, 1999.

TECHNICAL FIELD OF THE INVENTION

The invention relates to a threaded bolt provided with measurement planes for use in ultrasonic length measurement. More specifically, after the threaded bolt has been used to form a connection, a measurement is taken to determine the length change of the threaded bolt, and therefore determine the tension within the threaded bolt.

BACKGROUND OF THE INVENTION

It is known to provide a threaded bolt with measurement planes. Typically, the measurement planes are formed either at a recess or an elevation with respect to the actual end planes of both the head end and the insertion end. The measurement planes are often formed by means of cold deformation and finishing. One such threaded bolt is described in European patent application 0.459.365 which issued May 28, 1991, the contents of which are incorporated herein by reference.

Another threaded bolt is known from U.S. Pat. No. 4,846,001 which issued Jul. 11, 1989, in which the threaded bolt is shown as having a head which has been provided with a recess including a measurement plane. The measurement plane has been made sufficiently smooth/level by finishing, in order to be used in ultrasonic measuring. The recess is used for accommodating a piezo-electric sensor. In another embodiment the recess is absent and the sensor is placed on top of the end plane at the head.

Frequently, existing threaded bolts exhibit several radial planes at one or both ends, situated at various axial distances measured along the center line of the threaded bolt, which can adversely affect the ability to achieve accurate measurement results.

SUMMARY OF THE INVENTION

It is an object of the invention to reduce the number of radial planes exhibited by the threaded bolt, thereby improving the accuracy with which ultrasonic length measurements on the bolt can be performed.

One embodiment of the invention provides a threaded bolt having a proximal head end and a distal insertion end, wherein the proximal head end and the distal insertion end have been provided with a single, exposed radial measurement plane for use in ultrasonic length measurement in order to determine the tension in the threaded bolt after it has been used in a connection. The measurement plane at the distal insertion end is formed by the flat bottom of a recess at the distal insertion end, wherein the recess is bounded by a circumferential wall. The circumferential wall transitions into the flank of the distal insertion end via a buckle or curve. Therefore, multiple radial planes at the insertion end other than the measurement plane are prevented. Therefore, the ultrasonic length measurement is related only to the measurement plane at that location and double signals are prevented. The measurement plane is protected from pollution and damage by the recess.

Another embodiment of the invention provides a threaded bolt having a proximal head end and a distal insertion end, wherein the proximal head end and the distal insertion end have been provided with a single, exposed radial measurement plane for use in ultrasonic length measurement in order to determine the tension in the threaded bolt after it has been used in a connection. The measurement plane at the distal insertion end is formed by the flat bottom of a recess at the distal insertion end, wherein the recess is bounded by a circumferential wall and the outermost distal end of the threaded bolt is formed by a circular line.

In preferred embodiments, the transition from the circumferential wall of the recess into the flank of the distal insertion end may run according to a convex course, but preferably has a sharp buckle shape, thereby ruling out the occurrence of murmur while taking measurements as much as possible.

Preferably the circumferential wall of the recess forms a conical surface which is oblique with respect to the bolt center line, the angle of which is maximally 75° with respect to the bolt center line, preferably also more than 45°.

Preferably the flank in the distal end portion, which is contiguous to the circumferential wall of the recess, forms a flank conical surface oblique with respect to the bolt center line, the angle of which is maximally 45° with respect to the bolt center line. Preferably the flank conical surface at the proximal side changes into the cylindrical plane via a flank conical surface which is less oblique with respect to the bolt center line, for instance at 25–35°, which cylindrical plane may or may not be contiguously provided with the thread. Alternatively, the distal end of the bolt provided with the aforementioned recess is truncated at the flank.

Preferably the recess has been formed by means of an upsetting treatment of the insertion end. As a result of the upsetting treatment, the distal end of the bolt can be provided with its final form in one step. Alternatively, apart from the upsetting treatment for forming the recess, the oblique flank can be obtained by means of a machining treatment.

It is a further object of the invention to provide a threaded bolt which can easily be manufactured and is able to provide reliable measurement results.

To that end, a preferred embodiment of the invention provides a threaded bolt having a proximal head end and a distal insertion end, the proximal head end and the distal insertion end being provided with measurement planes for use in ultrasonic length measurement in order to determine the tension in the threaded bolt after it has been used in a connection. The measurement plane at the insertion end forms the complete end plane and has been arranged on the insertion end without a final processing operation.

In preferred embodiments, the measurement plane has been arranged at the distal insertion end by means of an upsetting treatment. The upsetting treatment can advantageously be performed during a heading treatment performed in a bolt-machine, also known as "bolt maker". In such a bolt machine, the upsetting of the head takes place in one operation. During the upsetting treatment, the measurement planes can be realised at both ends. Therefore, the exact axial distance between both measurement planes can be determined.

Alternatively, the upsetting operation for making the measurement planes may take place during the subsequent shank reduction.

By way of a further alternative, instead of by means of the upsetting treatment, the measurement plane at the insertion end can be made in the same bolt machine, but in a following station, where the point is made. This then takes place by means of a machining treatment.

The invention furthermore provides a method for manufacturing a threaded bolt according to the invention.

BRIEF DESCRIPTION OF THE DRAWINGS

The invention will now be elucidated on the basis of the examples shown in the attached drawings, in which:

FIGS. 2A and 2B show two exemplary embodiments of another threaded bolt according to the invention.

FIG. 3A shows a view of a bolt machine for manufacturing a threaded bolt according to the invention;

FIG. 4 shows a possible embodiment of the point making machine accommodated in the bolt machine according to FIG. 3B.

DETAILED DESCRIPTION

Figure 1A:
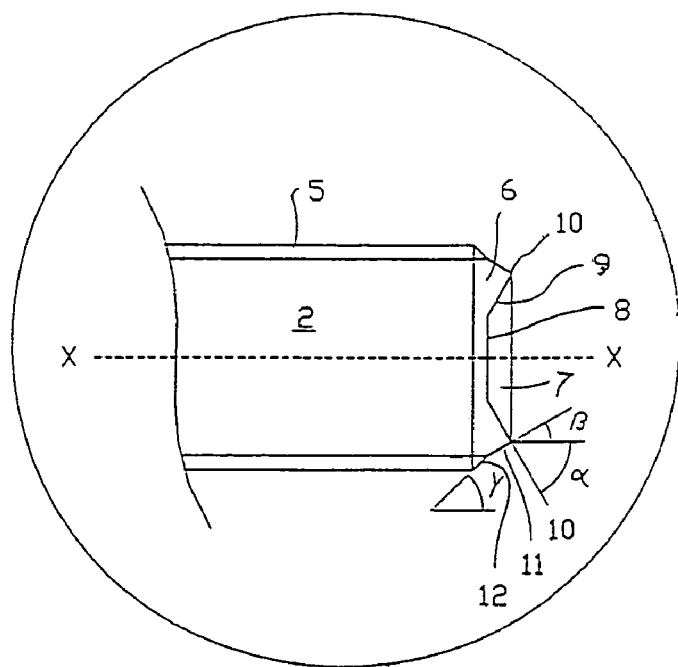
FIG. 1A shows a detail of the distal end of the threaded bolt of FIG. 1.
Figure 1:
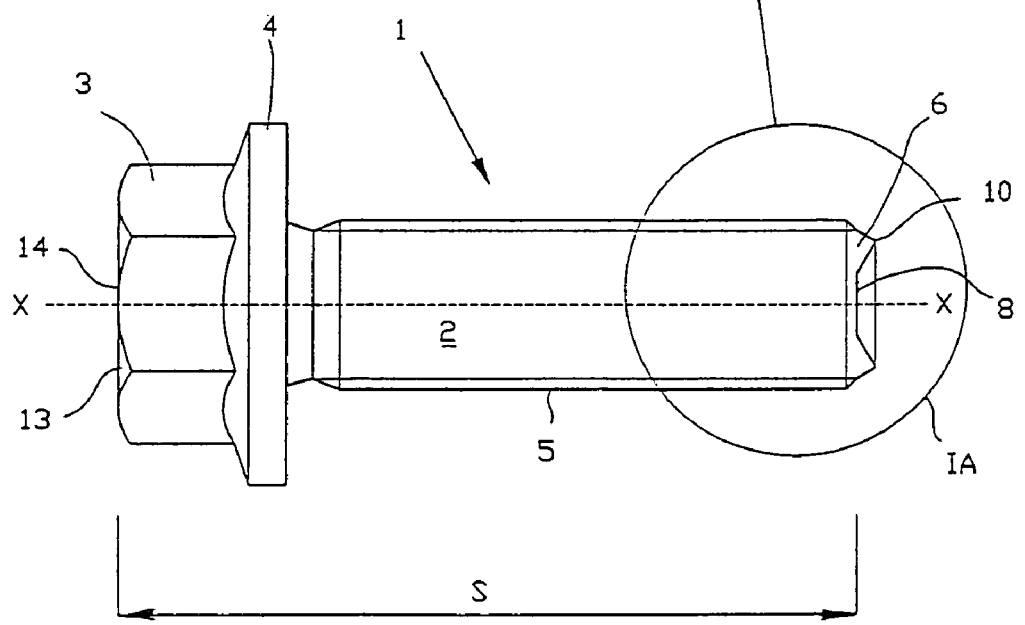
FIG. 1 shows a threaded bolt according to the invention, having a recessed measurement plane at the distal end.

The threaded bolt 1 shown in the FIGS. 1 and 1A comprises a shank 2 having a widened head 3 with flange 4, in which a thread 5 has been arranged on the shank 2. The distal end 6 of the shank 2, and thus the bolt 1, is shown enlarged in FIG. 1A. As shown in FIG. 1A, a recess 7 has been made in the distal end 6, the recess being axially bounded by a flat bottom 8 which extends perpendicular to the center line X of the bolt 1. The recess is radially bounded by an inclined circumferential plane 9 running concentrically about the center line X, the plane 9 is at angle a of 45°–75° with respect to the center line X. Via a sharp, line-shaped transition 10, which forms a buckle and which in end view forms a circular line, the distal end 6 changes radially to the outside into an inclined circumferential plane 11 which is also concentric with respect to the center line X. Inclined circumferential plane 11 is at an angle β with respect to the center line X, β maximally being 45°. It can be seen that the inclined circumferential plane 11, via a buckle, changes into a comparable inclined circumferential plane 12. However, inclined circumferential plane 12 is at an angle γ with respect to the center line X, which is different from the angle β and which here is 25 to 35°.

At the head 3 a flat plane 14 has also been provided on the end plane 13, which just like plane 8 is perpendicular to the center line X is suitable to serve as a measurement plane in ultrasonic measurements. The plane parallelism here amounts to a least 0.05 mm.

The recess 7 and the measurement plane 8 can be formed in a simple manner by upsetting the distal end 6 of the bolt (preferably made of steel) in a pointing machine. In the same upsetting treatment the circumferential planes 11 and 12 can be made. Alternatively, said planes 11 and 12 can be made by means of a machining treatment, as is discussed hereinafter in relation to FIG. 4.

During measuring, the sensor will be placed against the measurement plane 14, possibly with the help of a very thin layer of contact adhesive. With the help of ultrasonic measurement, the distance S, measured in a direction parallel to the center line X between the planes 8 and 14 (against which the sensor has been placed), can be exactly measured and determined. With that distance, the tension in the bolt can be determined. The accuracy of the ultrasonic measurement is improved as a result of only one radially oriented plane 8 being present in the distal end 6, therefore preventing multiple measurement signals.

By way of example, with a diameter of the circular line 10 of approximately 12 mm, the diameter of the plane 8 may be 4 mm.

Just like the measurement planes of the threaded bolt to be discussed below and shown in the FIGS. 2A and 2B, the measurement planes 8 and 14 may be formed without final processing operations, meaning that for plane 8 the upsetting treatment can be the last treatment of the plane.

Figure 3B:
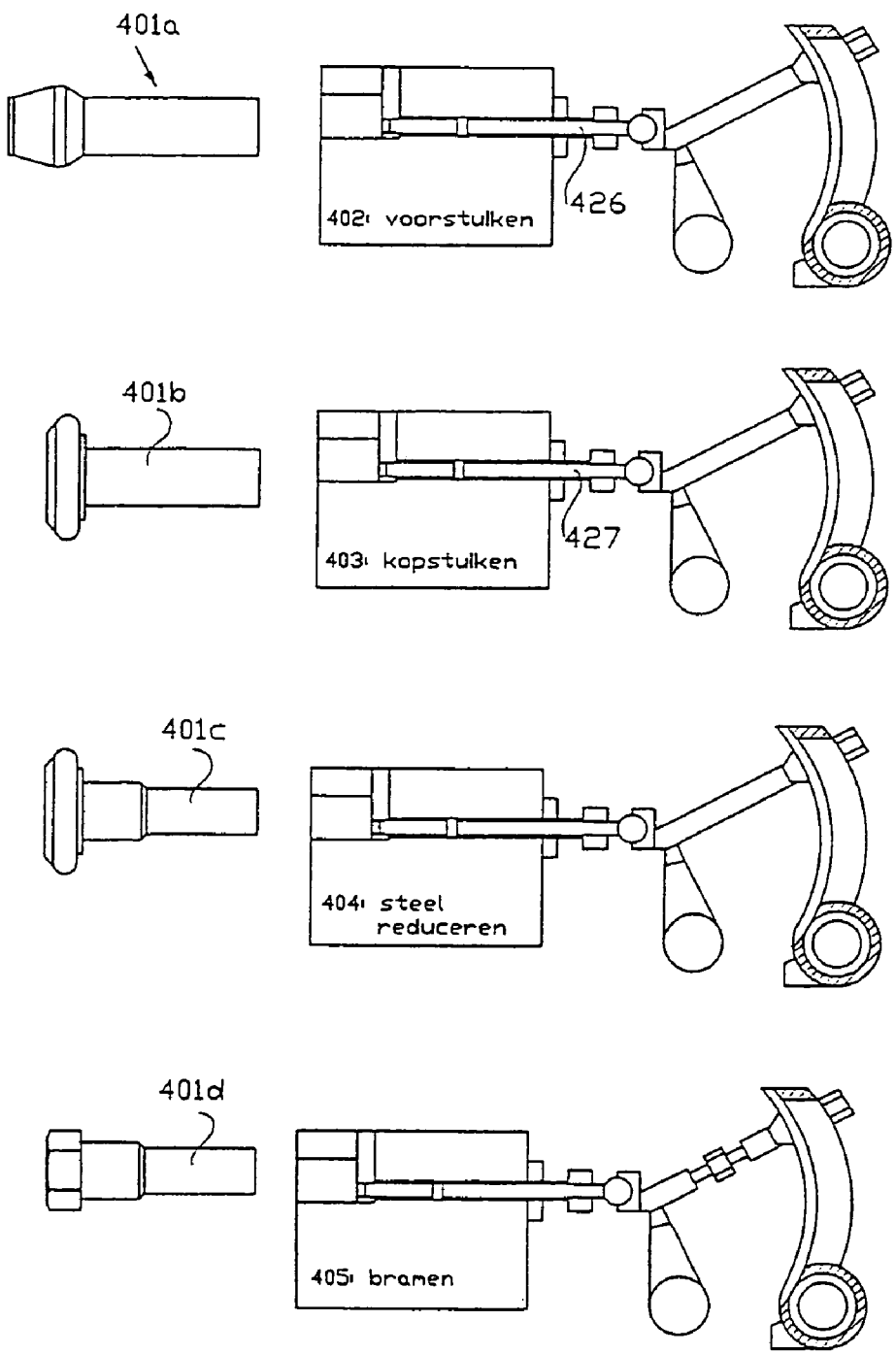
FIG. 3B shows consecutive stations within the bolt machine of FIG. 3A.

In FIG. 2A, comparable bolt parts as compared to the bolt in FIGS. 1 and 1A are shown with comparable reference numbers, increased by 100. Thus, the bolt 101 is provided with a distal measurement plane 108 and with a proximal measurement plane 114 which forms the bottom of a recess 115 in the proximal end plane 113 of the bolt 101. A sensor may be placed in the recess. 115. In this case, the distance S between the measurement planes 108 and 114 is exactly known: beforehand. The recess 115 and the measurement plane 114 have been formed during flat pre-upsetting (also see FIG. 3B), without final processing treatments (such as grinding) of the measurement plane. The measurement plane 108 has been formed here during upsetting, also without final processing treatments of the plane.

In FIG. 2B an alternative threaded bolt 201 has been shown, in which the same parts have the same reference numbers again, increased by 100 over those in FIG. 2A. In this case the measurement planes 208 and 214 have been formed at both the proximal end and at the distal end of the bolt 201. Just like the measure plane 108, the measurement plane 208 extends over approximately the entire diameter of the distal end, or insertion end.

In FIG. 3A, a bolt machine 320 is shown with which the bolts according to the FIGS. 1, 2A, 2B, and alternative embodiments can be made. Metal wire 321 is supplied from a roll 322, passes through the supply end 323 of the bolt machine 320 and is processed into threaded bolts. The threaded bolts are provided with measurement planes according to the invention and are discharged at the discharge end 324 where they are collected in a tray 325.

The bolt machine 320 includes a thread cutter for cutting a workpiece for the bolt (see FIG. 3B), a station 402 for pre-upsetting (after which the workpiece 401a is obtained), a station 403 for heading (after which a workpiece 401b is obtained), a station 404 for reducing the shank (after which a workpiece 401c is obtained), and a station 405 for trimming (after which a workpiece 401d is obtained). The workpieces 401d are subsequently subjected to a point-making treatment in a pointing machine. accommodated in the same bolt machine 320, and after that to a thread rolling treatment, also in the same bolt machine 320.

As stated, the measurement planes in the bolts according to the invention can be arranged by cold deformation during heading, in station 403, either by integrally forming a recess in the head or not. During this upsetting of the head use is made of an especially formed stamp in station 403. For making the measurement plane at the distal or insertion end a push-out pin 426 or 427 especially formed for that purpose can be used for deforming the distal end in the wanted manner by upsetting in station 402 or 403.

Thus, without particular further provisions, a threaded bolt can be formed having measurement planes which are suitable for ultrasonic length measurements.

The pointing machine 530 of FIG. 4, accommodated in the bolt machine 320, can alternatively be used for making the measurement plane at the distal end which is formed by the end plane of the distal end. As can be seen, two cutter plates 531 and 532 have been arranged which are hingeable and can be adjusted in angular position. The cutter plate 531 is positioned inclined and the cutter plate 532 horizontally to cut the measurement plane. Here again, the exact distance between both the measurement/end planes is known. Both cutter plates are rotated about the insertion end, whereas the bolt is held against rotation.

What is claimed is:

1. Threaded bolt, for use in ultrasonic measurement for determining the tension in the threaded bolt after it has been used in a connection, said bolt being formed as a single unitary piece of material having a proximal head end and a distal insertion end extended about a shank having a substantially cylindrical body and a longitudinal axis, the proximal head end and the distal insertion end are each provided with only a single, planer surface which is perpendicular to the longitudinal axis wherein the planer surfaces from radial measurement planes which are exposed in opposite axial directions, the radial measurement plane at the insertion end being formed by a freely exposed, flat bottom of a recess at the distal insertion end, wherein the recess is bounded by a first circumferential plane or surface which at a point of change transitions into a second circumferential plane or surface of the distal insertion end via a buckle, wherein the proximal head end is adapted to detachably receive a sensor for measuring a distance between said measurement planes, and wherein the proximal head end has an proximal outer end plane oriented perpendicular to the longitudinal axis, wherein the measurement plane at the proximal head end is located on and formed by the proximal outer end plane.

2. Threaded bolt according to claim 1, wherein the point of change from the first circumferential plane of the recess into the second circumferential plane is a sharp buckle shape.

3. Threaded bolt according to claim 2, wherein the first and the second circumferential planes each have a first and a second normal, respectively, said first and second normals having directional components in a direction perpendicular to the longitudinal axis, said directional components being opposite to one another.

4. Threaded bolt according to claim 1, wherein the first circumferential plane of the recess forms a conical surface which is oblique with respect to the longitudinal axis, the angle of which is maximally 75° with respect to the longitudinal axis.

5. The threaded bolt according to claim 4, wherein the angle of the conical surface is greater than 45°.

6. Threaded bolt according to claim 1, wherein the second circumferential plane is contiguous to the first circumferential plane of the recess and forms a conical surface oblique with respect to the longitudinal axis, the angle of which is maximally 45° with respect to the longitudinal axis.

7. Threaded bolt according to claim 6, wherein the conical surface of the second circumferential plane at a proximal side changes into a third cylindrical plane via an angle which is oblique with respect to the longitudinal axis, which cylindrical plane is contiguously provided with the thread.

8. The threaded bolt according to claim 7, wherein the angle of the conical surface of the third cylindrical plane is between 25–35°.

9. Threaded bolt according to claim 1, wherein the distal insertion end of the bolt is truncated.

10. Threaded bolt according to claim 1, wherein the recess has been formed by means of one single upsetting treatment of the insertion end.

11. Threaded bolt according to claim 1, wherein said conical plane on said second circumferential plane has been obtained by means of a machining treatment.

12. Threaded bolt according to claim 1, wherein the measurement plane on the distal insertion end has been arranged without final processing operation.

13. The threaded bolt according to claim 1, wherein an entirety of a surface of the bolt along the outermost proximal end plane is available for measurement.

14. Threaded bolt, for use in ultrasonic measurement for determining the tension in the threaded bolt after it has been used in a connection, said bolt being formed as a unitary single unitary piece of material piece having a proximal head end and a distal insertion end extended about a shank having a substantially cylindrical body and a longitudinal axis, the proximal head end and the distal insertion end are each provided with only a single, planar surface which is perpendicular to the longitudinal axis wherein the planer surfaces from radial measurement planes which are exposed in opposite axial directions, the radial measurement plane at the insertion end being formed by a freely exposed, flat bottom of a recess at the distal insertion end, wherein the recess is bounded by a first circumferential plane or surface which at a point of change transitions into a second circumferential plane or surface of the distal insertion end at an outermost portion of the distal insertion end, said outermost portion of the distal insertion end being formed by a circular line in a plane perpendicular to the longitudinal axis, and wherein the proximal head end is structured and arranged to detachably receive a sensor for measuring a distance between the measurement planes, wherein the proximal head end has an outermost proximal end plane oriented perpendicular to the longitudinal axis, wherein the measurement plane at the proximal head end is located on and formed by the outermost proximal end plane.

15. Threaded bolt according to claim 14, wherein the point of change from the first circumferential plane of the recess into the second circumferential plane is a sharp buckle shape.

16. Threaded bolt according to claim 15, wherein the first and the second circumferential planes each have a first and a second normal, respectively, said first and second normals having directional components in a direction perpendicular to the longitudinal axis, said directional components being opposite to one another.

17. Threaded bolt according to claim 14, wherein the first circumferential plane of the recess forms a conical surface which is oblique with respect to the longitudinal axis, the angle of which is maximally 75° with respect to the longitudinal axis.

18. The threaded bolt according to claim 17, wherein the angle of the conical surface is greater than 45°.

19. Threaded bolt according to claim 14, wherein the second circumferential plane is contiguous to the first circumferential plane of the recess and forms a conical surface oblique with respect to the longitudinal axis, the angle of which is maximally 45° with respect to the longitudinal axis.

20. Threaded bolt according to claim 19, wherein the conical surface of the second circumferential plane at a proximal side changes into a third cylindrical plane via an angle which is oblique with respect to the longitudinal axis, which cylindrical plane is contiguously provided with the thread.

21. The threaded bolt according to claim 20, wherein the angle of the conical surface of the third cylindrical plane is between 25–35°.

22. Threaded bolt according to claim 14, wherein the distal insertion end of the bolt is truncated.

23. Threaded bolt according to claim 14, wherein the recess has been formed by means of one single upsetting treatment of the insertion end.

24. Threaded bolt according to claim 14, wherein said conical plane on said second circumferential plane has been obtained by means of a machining treatment.

25. Threaded bolt according to claim 14, wherein the measurement plane on the distal insertion end has been arranged without final processing operation.

26. Threaded bolt having a proximal head end and a distal insertion end, said bolt being formed as a single unitary piece of material and having a longitudinal axis extending between both said ends, wherein the head end and the insertion end have each been provided with only a single, freely planer surface which is perpendicular to the longitudinal axis, wherein the planer surfaces from radial measurement planes which are exposed in opposite axial directions for use in ultrasonic length measurement for determining the tension in the threaded bolt after it has been placed in a connection, wherein the measurement plane at the insertion end has a flat bottom of a recess at the insertion end, wherein the recess is bounded by a circumferential wall, which seen in cross-section at the outermost distal end of the bolt changes direction at a substantially V-shaped portion into a flank of the insertion end, wherein the proximal head end has an outermost proximal end plane, wherein the measurement plane at the proximal head end is located on the outermost proximal end plane, wherein both measurement planes are perpendicular to the longitudinal axis, and wherein said proximal head end is adapted to removably receive a sensor for measuring a distance between the measurement planes.

27. Threaded bolt according to claim 26, wherein the change from the circumferential wall of the recess into the flank runs according to a convex course.

28. Threaded bolt according to claim 26, wherein the change from the circumferential wall of the recess to the flank has a sharp buckle shape.

* * * * *